United States Patent
Sharpe et al.

(10) Patent No.: US 7,194,478 B2
(45) Date of Patent: Mar. 20, 2007

(54) VIRTUAL PROCESS FILE SYSTEMS AND METHODS THEREFOR

(75) Inventors: Edward J Sharpe, Los Gatos, CA (US); Louis D. Huemiller, Jr., San Jose, CA (US); Sushanth Rai, Sunnyvale, CA (US); Zhi-Hui Xu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 269 days.

(21) Appl. No.: 10/293,073

(22) Filed: Nov. 12, 2002

(65) Prior Publication Data

US 2004/0093335 A1    May 13, 2004

(51) Int. Cl.
G06F 7/00 (2006.01)
G06F 17/00 (2006.01)
G06F 9/46 (2006.01)
G06F 12/00 (2006.01)
G06F 13/00 (2006.01)
G06F 13/28 (2006.01)
G06F 9/44 (2006.01)
G06F 3/00 (2006.01)

(52) U.S. Cl. ............ 707/102; 718/100; 711/100; 719/321

(58) Field of Classification Search ............ 707/102; 718/102, 100; 711/100; 719/321
See application file for complete search history.

(56) References Cited

U.S. PATENT DOCUMENTS 5,459,867 A * 10/1995 Adams et al. .............. 719/321
5,627,996 A * 5/1997 Bauer ......................... 703/20
6,430,164 B1 * 8/2002 Jones et al. ................. 370/313

OTHER PUBLICATIONS

Mahmoud et al, 'A DOS/LINUX extensible file system', Jul. 1-3, 1997, IEEE, pp. 311-315☐☐.*

* cited by examiner

Primary Examiner—Don Wong
Assistant Examiner—Cheryl M Shechtman (57) ABSTRACT

A method in a computer for facilitating interaction between an application program and a subsystem is disclosed. The method includes providing a virtual process file system layer. The virtual process file system layer is configured to interact with the subsystem in a substantially content-independent manner. The method additionally includes providing a content dependent module, the content dependent module being associated with the subsystem and is configured interact with the subsystem in a content-dependent manner. The method further includes providing a directory structure table, the directory structure table being configured to track a name of the content dependent module, wherein the content-dependent module is configured to be registered with the directory structure table using a dynamic name.

28 Claims, 7 Drawing Sheets

VIRTUAL PROCESS FILE SYSTEMS AND METHODS THEREFOR

BACKGROUND OF THE INVENTION

Files and file operations, such as read, write, open, close, and the like are familiar with computer users and programmers. Because of this familiarity, the file system paradigm has been employed to monitor and manage other processes and entities, which may not, at first glance, be thought of as data storage files.

For example, one of the main functions of an operating system is to manage tasks or processes executed in a computer system. If the data pertaining to the tasks or processes can be represented as files, these tasks or processes can be monitored and/or manipulated and/or controlled using the familiar file system commands. In UNIX, for example, there is provided a process file system or ProcFS to manage the interactions between the applications and the tasks/processes, which have been modeled by files in order to allow the applications to monitor and/or control the tasks/processes using the familiar file system user command and application program interface.

Figure 1:
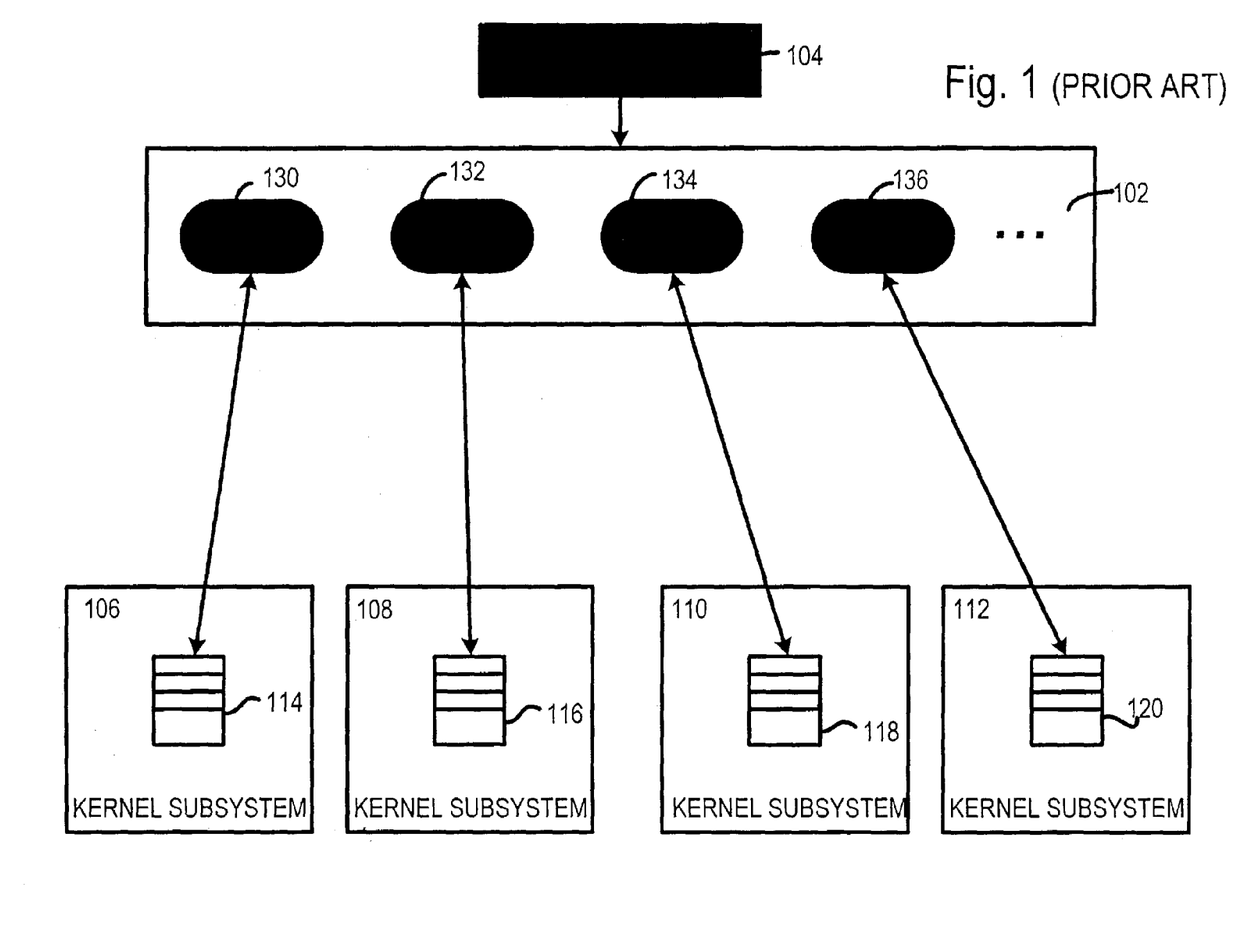
FIG. 1 illustrates a typical ProcFS arrangement in which a ProcFS is employed to facilitate the interactions between the applications and a plurality of kernel subsystems.

To facilitate discussion, FIG. 1 illustrates a typical ProcFS arrangement in which a ProcFS 102 is employed to facilitate the interactions between applications 104 and a plurality of kernel subsystems 106, 108, 110 and 112. Within each kernel subsystem, there is provided one or more internal kernel data structures, which reflect the status of the associated kernel subsystem and contain information that ProcFS 102 wishes to monitor and/or control. These internal kernel data structures are shown for kernel subsystems 106, 108, 110 and 112 as respective internal kernel data structures 114, 116, 118 and 120.

In the example of FIG. 1, kernel subsystem 106 represents a file descriptor subsystem, which deals with the set of open files for processes in the system. Kernel subsystem 108 represents the scheduler subsystem, which schedules execution entities in the system. Kernel subsystem 110 represents the task/process subsystem, which manages the creation and destruction of threads, processes, and tasks in the system. Kernel subsystem 112 represents the virtual memory subsystem, which manages virtual and/or real memory for the processes. ProcFS 102 and the various kernel subsystems may reside in the operating system's kernel space. Unlike other file systems, the end user cannot add, delete, and modify files in ProcFS.

ProcFS 102 includes a plurality of pseudo-files whose contents are created based on the internal kernel data structures of their respective kernel subsystems. That is, a pseudo-file that is associated with a kernel subsystem reflects the data in the internal data kernel structure of its associated kernel subsystem. If the data within internal kernel data structure 114 of kernel subsystem 106 changes, for example, the content of pseudo-file 130, which is associated with kernel subsystem 106, would correspondingly change.

When an application makes a call into ProcFS 102 to request monitoring and/or controlling one of the kernel subsystems, ProcFS 102 opens the pseudo-file(s) the application is interested in and allows the application to access the contents of the appropriate pseudo-file(s) in order to monitor the operation of the associated task/process in the relevant kernel subsystem and/or to control its operation by writing parameters, for example.

Although the ProcFS arrangement of FIG. 1 (and its variations) has been in use for some time, there are disadvantages. One of the main disadvantages of the ProcFS arrangement of FIG. 1 relates to the monolithic nature of ProcFS 102. In ProcFS 102, the set of pseudo-files (e.g., pseudo-files 130, 132, 134 and 136) as well as the content, format, and file directory hierarchy of each, is determined by the OS engineers at the time of OS creation and is fixed at the time of OS creation. If one of the kernel subsystems is modified, or a new kernel subsystem is desired, ProcFS 102 must be modified as a single unit.

Because there is no industry standard that governs the content, file format, and file directory hierarchy of ProcFS 102, different vendors implement ProcFS 102 differently, and even the same vendor may implement ProcFS 102 differently from version to version. Thus, when a user wishes to make changes to one of the kernel subsystems or wishes to introduce a new kernel subsystem, the OS engineers who originally designed ProcFS 102 may need to be consulted. Because of the complex nature of operating systems and its various subsystems, it is generally the case that different teams within the company that supplies the OS may need to coordinate in order to change ProcFS 102.

Figure 2:
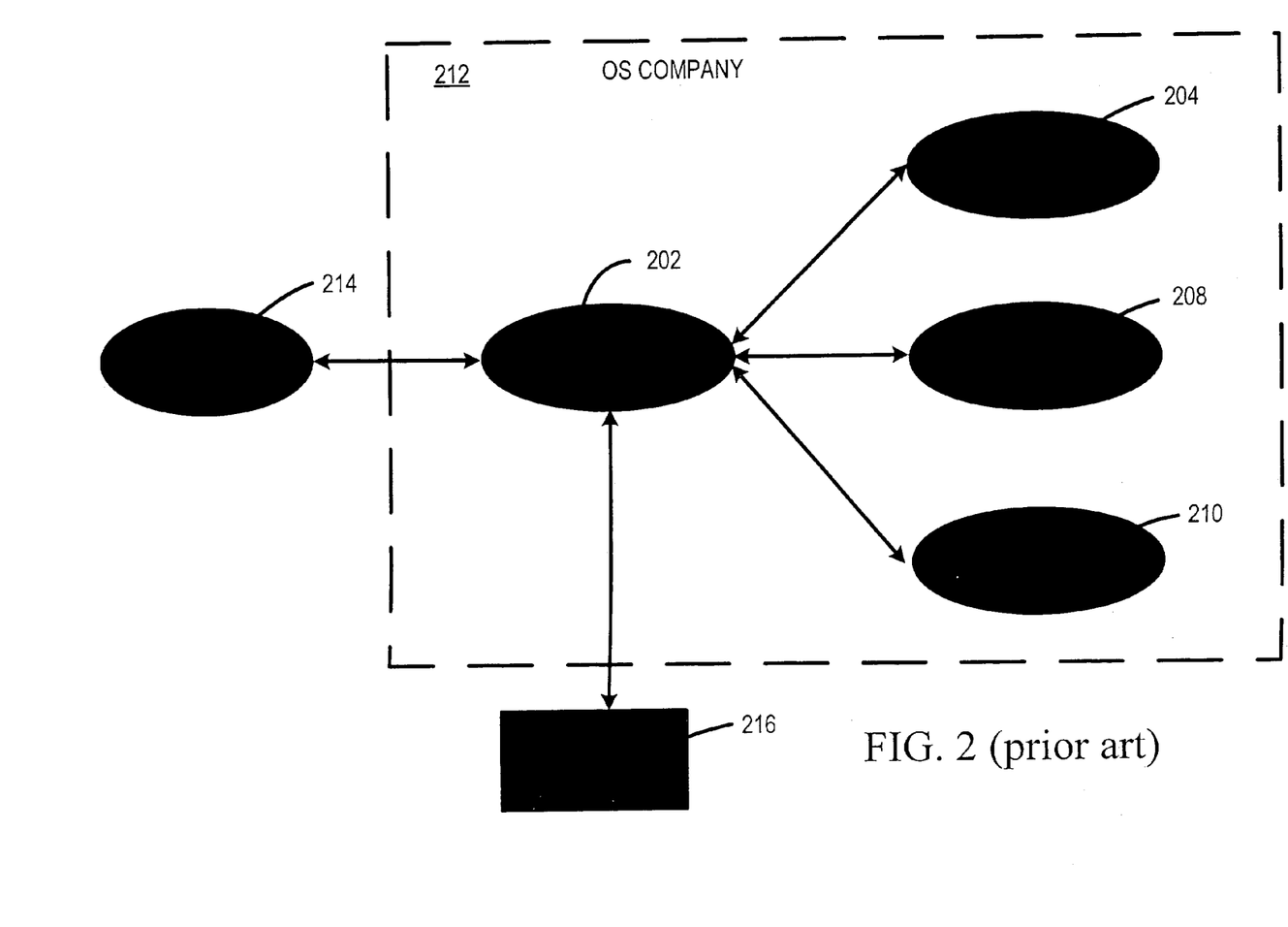
FIG. 2 conceptually illustrates the coordination effort required to update a prior art ProcFS.

This situation is conceptually illustrated in exemplary FIG. 2, wherein ProcFS team 202 must coordinate with file system team 204, process management team 208, virtual memory team 210, as well as with individuals outside of OS company 212 (such as one or more independent software vendors, ISV 214) in order to create an updated or a new ProcFS 216. The complexity involved in making a change to the prior art ProcFS often results in an undue amount of delay in delivering the updated ProcFS to the customer requesting the change, thus giving rise to customer dissatisfaction.

Furthermore, when application 104 of FIG. 1 makes a call into ProcFS 102, the resultant query into pseudo-file 130 crosses subsystem boundaries. This is an undesirable data coupling behavior from a modularity point of view, which behavior is a direct result of the monolithic nature of ProcFS 102. The data coupling makes maintenance and update of ProcFS 102 unnecessarily complex as well reducing its overall reliability.

SUMMARY OF THE INVENTION

The invention relates, in one embodiment, to a process file system in an operating system of a computer, the process file system being configured to allow an application program to monitor information pertaining to a plurality of subsystems. The process file system includes a virtual process file system layer for interacting with the plurality of subsystems in a substantially content-independent manner. The process file system also includes a plurality of content-dependent modules, each of the plurality of subsystems being associated with at least one of the plurality of content-dependent modules, a first content-dependent module of the plurality of content-dependent modules being configured to access a first data structure of a first subsystem of the plurality of subsystems. The process file system additionally includes an interface facilitating data exchange between the plurality of content-dependent modules and the virtual process file system layer. The process file system further includes a directory structure table, the directory structure table containing names of the plurality of content-dependent modules, a name of the plurality of content-dependent modules being registered with the directory structure table by respective one of the plurality of content-dependent modules upon initialization of the respective one of the plurality of content-dependent modules, wherein at least one name associated one content-dependent module of the plurality of dependent modules is registered in the directory structure table as a dynamic name.

In another embodiment, the invention relates to a method for facilitating interaction between an application program and a plurality of subsystems. The method includes providing a virtual process file system layer, the virtual process file system layer being configured to interact with the plurality of subsystems in a substantially content-independent manner. The method further includes providing a plurality of content-dependent modules, each of the plurality of subsystems being configured to be associated with at least one of the plurality of content-dependent modules, a first content-dependent module of the plurality of content-dependent modules being configured to access a first data structure of a first subsystem of the plurality of subsystems. The method additionally includes providing an interface for facilitating data exchange between the plurality of content-dependent modules and the virtual process file system layer. The method further includes providing a directory structure table, the directory structure table being configured to track names of the plurality of content-dependent modules, a name of the plurality of content-dependent modules being configured to be registered with the directory structure table by respective one of the plurality of content-dependent modules upon initialization of the respective one of the plurality of content-dependent modules, wherein at least one name associated one content-dependent module of the plurality of dependent modules is configured to be registered in the directory structure table as a dynamic name.

In yet another embodiment, the invention relates to a method in a computer for facilitating interaction between an application program and a subsystem. The method includes providing a virtual process file system layer. The virtual process file system layer is configured to interact with the subsystem in a substantially content-independent manner. The method additionally includes providing a content dependent module, the content dependent module being associated with the subsystem and is configured interact with the subsystem in a content-dependent manner. The method further includes providing a directory structure table, the directory structure table being configured to track a name of the content dependent module, wherein the content-dependent module is configured to be registered with the directory structure table using a dynamic name.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, the ProcFS is partitioned into two distinct layers: a virtual ProcFS layer and a content-dependent layer. The virtual ProcFS layer is responsible for interacting with the applications in a substantially content-independent manner, i.e., in a manner that it is substantially independent of the content, format, and file directory hierarchy of the files that reflect the internal kernel data structures within the various kernel subsystems.

The content-dependent layer contains a plurality of content-dependent modules. Each content-dependent module includes the file(s) which reflect the data in the internal kernel data structure of its associated kernel subsystem, as well as any necessary logic to access the internal kernel data structure to reflect the aforementioned data in the file(s). By performing file system-like operations on these files, the applications can monitor and/or control the operation of the kernel subsystems using the familiar file system paradigm.

Between the virtual ProcFS layer and the plurality of content-dependent modules in the content-dependent layer, there is provided a well-defined interface to allow any content-dependent module to register with the virtual ProcFS layer and to communicate therewith. Except through the interface, there is no direct data coupling between the virtual ProcFS layer and the plurality of content-dependent modules.

When a new content-dependent module is loaded into the system, the content-dependent module informs the virtual ProcFS layer of its name and its location to allow the virtual ProcFS layer to subsequently access the content-dependent module, and more specifically the content of the file(s) therein, in order to monitor and/or update the contents of the internal kernel data structures in the kernel subsystem of interest.

In this manner, when a kernel subsystem needs to be updated or a new kernel subsystem needs to be introduced, its associated content-dependent module can be loaded into the system, registered with the virtual ProcFS layer, and the associated content-dependent module can begin to provide information pertaining to its associated internal kernel data structure to the requesting application without requiring changes to other parts of the ProcFS.

Furthermore, there is provided, in accordance with one embodiment of the present invention, a technique for allowing a content-dependent module to register itself even though its exact name as required by the calling application may be unknown until the time the content-dependent module is called by the application. In one embodiment, simple enumerations in the user/application view are represented in the virtual ProcFS layer view in accordance with an inventive naming convention for representing dynamic names. Dynamic names registered at registration time are then dynamically generated into name instances when the modules are called by the applications.

By allowing content-dependent modules to register themselves using dynamic names, there is advantageously no need to know in advance at registration time the file directory hierarchy and/or the exact names required by the application at execution time. This is important for transient tasks and processes that may come and go, and facilitates plug-and-play replacement and/or addition of content-dependent modules.

Figure 3:
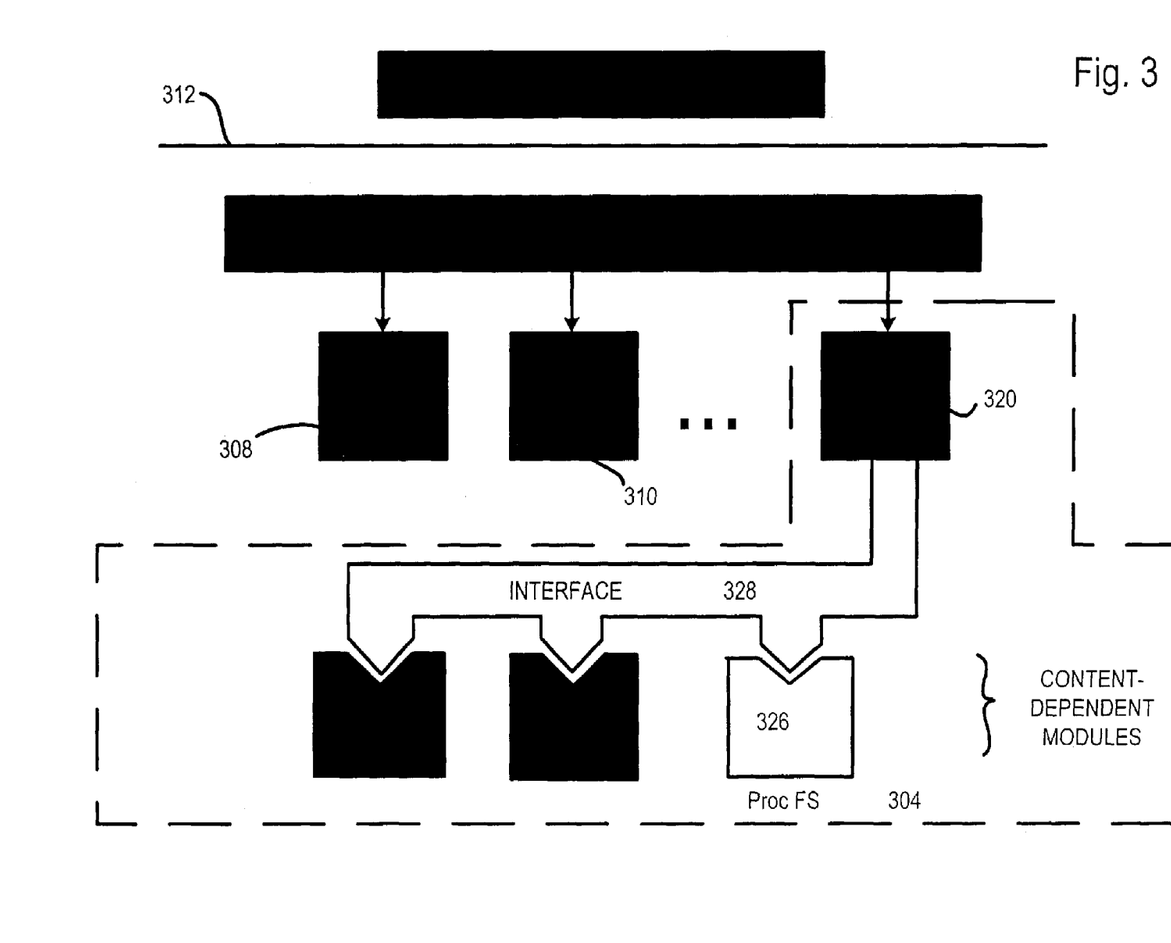
FIG. 3 shows, in accordance with one embodiment of the present invention, a simplified architecture diagram of the ProcFS system in which the ProcFS has been partitioned into a virtual ProcFS layer and a content-dependent layer.

The features and advantages of the present invention may be better understood with reference to the drawings and discussions that follow. FIG. 3 shows, in accordance with one embodiment of the present invention, a simplified architecture diagram of the ProcFS system in which the ProcFS has been partitioned into a virtual ProcFS layer and a content-dependent layer. User-application 302 accesses ProcFS 304 via a virtual file system 306. A line 312 delineates the user space, which is above line 312, from the kernel space of the operating system, which is drawn below line 312.

Virtual file system 306 supports multiple individual file systems and contains the abstractions of the individual file systems so that the applications can make high-level calls (such as read, write, seek, open, load, and the like) without having to know the specifics of the individual file systems. Exemplary file systems shown in FIG. 3 include ProcFS 304, NFS (Network File System) 308, NTFS (Windows NT File System) 310, and the like. Thus, ProcFS is seen as another file system from the perspective of the applications.

ProcFS 304 itself is further partitioned into a virtual ProcFS layer 320 and a content-dependent layer containing a plurality of content-dependent modules 322, 324 and 326. A common interface 328 allows any content-dependent module to load itself into ProcFS 304, to register itself with virtual ProcFS layer 320, and to render the contents of its file(s) accessible to application 302 in a substantially content-independent manner.

Figure 4:
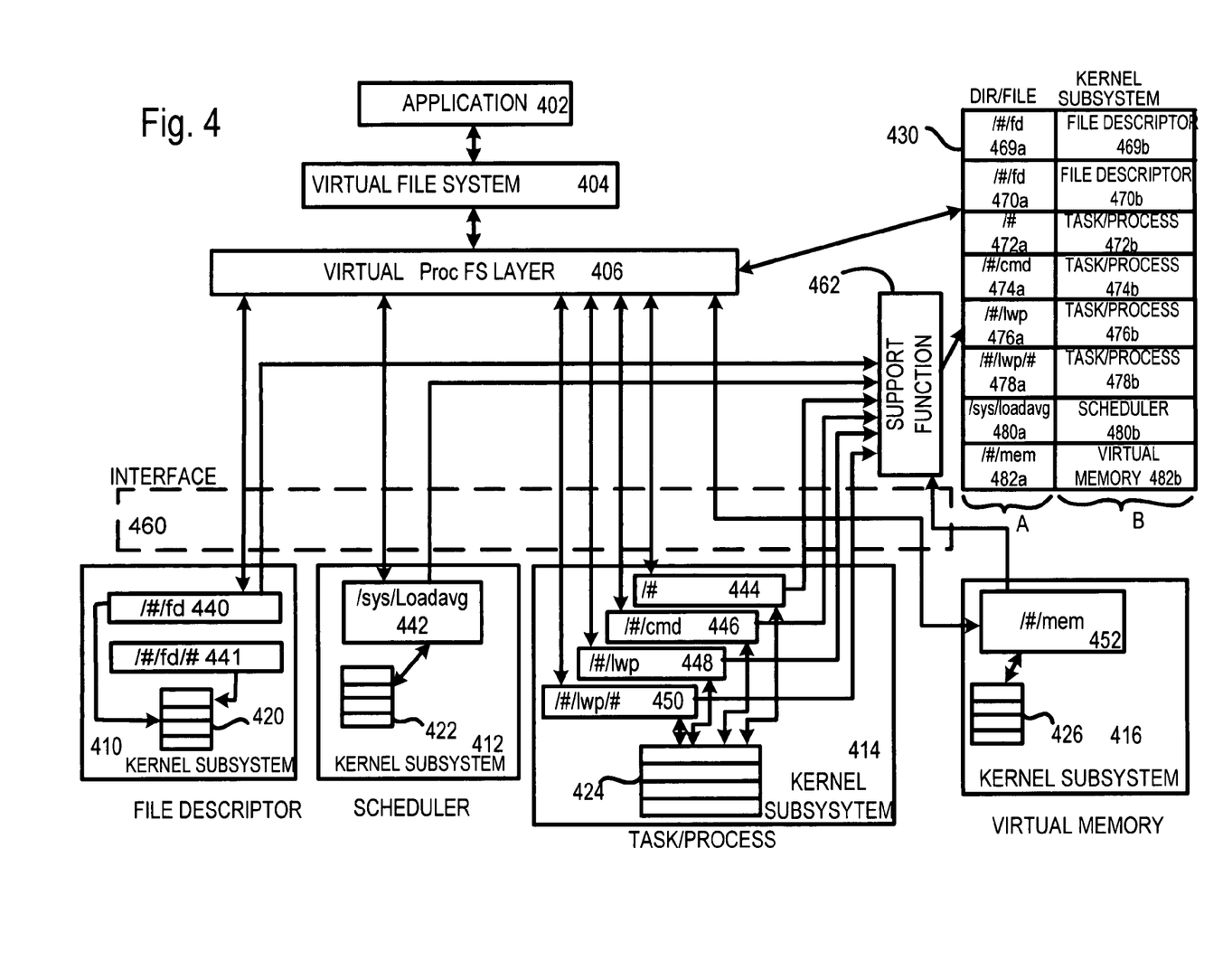
FIG. 4 shows in greater detail, in accordance with one embodiment of the present invention, a ProcFS arrangement in which the ProcFS has been partitioned into a virtual ProcFS layer and a content-dependent layer.

FIG. 4 shows in greater detail, in accordance with one embodiment of the present invention, a ProcFS arrangement in which the ProcFS has been partitioned into a virtual ProcFS layer and a content-dependent layer. In FIG. 4, application 402 accesses the ProcFS through a virtual file system 404. Virtual ProcFS layer 406 of the ProcFS receives a request from application 402 via virtual file system 404, which request may pertain to, for example, a request to monitor data within internal kernel data structures associated with kernel subsystems 410, 412, 414 or 416.

In the example of FIG. 4, kernel subsystem 410 represents the file descriptor subsystem; kernel subsystem 412 represents the scheduler subsystem; kernel subsystem 414 represents the task/process subsystem; and kernel subsystem 416 represents the virtual memory subsystem. Within each kernel subsystem of FIG. 4, there is shown an internal kernel data structure. Internal kernel data structures 420, 422, 424 and 426 correspond to respective kernel subsystems 410, 412, 414 and 416 of FIG. 4.

After receiving the request from application 402, virtual ProcFS layer 406 consults a directory structure table 430 to ascertain the name of the content-dependent module responsible for providing the requested data. The name of the responsible content-dependent module is typically derived from the parameters given by application 402. The lookup provides the name of the responsible content-dependent module, which is then employed by virtual ProcFS layer 406 to access the file or files associated with the content-dependent module. As mentioned, the contents of the file or files provided in the content-dependent module reflect(s) the data in the internal kernel data structure within the kernel subsystem of interest to the calling application.

For example, if a lookup reveals that application 402 wishes to access information pertaining to kernel subsystem 410, virtual ProcFS layer 406 would look up the name of content-dependent module 440 associated with kernel subsystem 410 and employs the content-dependent module 440 to provide the data contents of the file to allow application 402 to monitor the data in internal data kernel data structure 420 of kernel subsystem 410.

The details required to access internal kernel data structure 420 are encapsulated within content-dependent module 440. That is, virtual ProcFS layer 406 is not required to know the details regarding the content and format of internal kernel data structure 420 to service the request by application 402. Furthermore, virtual ProcFS layer 406 does not need to know the exact directory hierarchy required for calling content-dependent module 440 since this information is encapsulated in directory structure table 430. Directory structure table 430 itself is maintained by the content-dependent modules and support module 462. A similar arrangement exists with respect to kernel subsystems 412 and 416 in that each is associated with a content-dependent module (442 and 452 respectively).

There is shown associated with kernel subsystem 414 a plurality of content-dependent modules 444, 446, 448 and 450. Multiple content-dependent modules can be provided for a given kernel subsystem to provide different information to the virtual ProcFS layer. As shown in FIG. 4, the communication between virtual ProcFS layer 406, the various content-dependent modules, and support function 462 is accomplished via a common interface 460. Any content-dependent module written to conform to common interface 460 may be dynamically loaded into and removed from the ProcFS arrangement of FIG. 4 without requiring changes to other parts of the ProcFS system.

FIG. 4 also shows a support module 462. One of the main functions of support module 462 is to provide for the registration of content-dependent modules into directory structure table 430, and the removal of the entries from directory structure table 430 when a given content-dependent module is unloaded. When the module is first initialized, either at system initialization or when the content-dependent module is dynamically loaded, the content-dependent module calls support module 462 to register itself with directory structure table 430. Among the information provided to directory structure table 430 are the name of the content-dependent module and the memory address of the content-dependent module so that the content-dependent module can be called upon by the virtual ProcFS layer 406 when virtual ProcFS layer 406 consults directory structure table 430 in response to a request by application 402. Support module 462 also performs other housekeeping functions, such as memory management, buffer management, tracking the content of the register states, and the like.

Because virtual ProcFS layer 406 is not required to know the details regarding the content or format of the internal kernel data structure within the kernel subsystems, and in fact is not required to know the exact directory hierarchy in directory structure table 430, there is no need to change virtual ProcFS layer 406 when a kernel subsystem is updated or a new kernel subsystem is loaded. As long as the content-dependent module (which encapsulates the details necessary to access the internal kernel data structure of the kernel subsystem of interest) conforms to common interface 460, neither virtual ProcFS layer 406 nor other content-dependent modules of the ProcFS system needs to be modified.

Since the processes or tasks are modeled as files, access to the content-dependent modules follows the file system paradigm and uses a combination of the directory hierarchy path name and file name in order to accomplish the file system-like calls. There are at least two types of entries in the process file system, static and dynamic. Generally speaking, static entries are employed in those cases where the actual names are known at the time of registration. A static entry does not change until the entry is deleted. The static name shown by reference number 442 in FIG. 4 is one such example.

Dynamic entries are those which come into existence when the application/user requests for them. Examples include representation of processes as directories that are named after process id's, representation of threads that are named after thread id's, and the like. Processes and threads are transient that come and go. Accordingly, it is not possible to know in advance at registration time the number and names of processes or threads within a process in the system since they may change from one point in time to the next. To render the virtual ProceFS layer (such as virtual ProcFS layer 406 of FIG. 4) truly virtual and independent of the file organization associated with the content-dependent layer, it is important to be able to accommodate both static and dynamic entries.

In the prior art monolithic model, there was no concept of separate content-independent and content dependent layers. The content/format and directory structure knowledge was built into the monolithic implementation. Even for prior art implementations that support limited plug-ins, such as in the Linux case, the plug-in modules only support static entries and do not support dynamic entries.

In accordance with one aspect of the present invention, an inventive technique is employed to allow a content-dependent module, whose exact name may not be known at the time of registration, to register itself with the directory structure table. One embodiment facilitates the creation of simple enumerations, which are then dynamically generated into name instances when the registered content-dependent modules are called by the application. The technique may use special naming conventions distinct from names used for static entries. In the examples that follow, the hash symbol (#) is employed although other unique symbol or combination of symbols may well be employed.

In the exemplary directory structure table 430, the hash (#) symbol is shown in the module names registered in boxes 469a, 470a, 472a, 474a, 476a, 478a and 482a to denote that these are dynamic names. These names correspond to the content-dependent modules supporting the corresponding subsystems shown in column B of directory structure table 430. An exemplary dynamic entry into directory structure table may relate to the name of the content-dependent module responsible for the identification of tasks existing in the system at any given point in time.

Thus, in exemplary FIG. 4, the dynamic name in box 469a (/#/fd/#) represents the name (including the directory path name and the file name) registered by content-dependent module 441 associated with file descriptor subsystem 410. The dynamic name in box 470a (/#/fd) represents the name (including the directory path name and the file name) registered by content-dependent module 440 associated with file descriptor subsystem 410. The dynamic name in box 472a (/#) represents the name (including the directory path name and the file name) registered by the content-dependent module 444 associated with the task/process subsystem 414. The dynamic name in box 474a (/#/cmd) represents the name (including the directory path name and the file name) registered by content-dependent module 446 associated with task/process subsystem 414. The dynamic name in box 476a (/#/lwp) represents the name (including the directory path name and the file name) registered by the content-dependent module 448 associated with the task/process subsystem 414. The dynamic name in box 478a (L#/lwp/#) represents the name (including the directory path name and the file name) registered by the content-dependent module 450 associated with task/process subsystem 414. The dynamic name associated with box 482a (/#/mem) represents the name (including the directory path name and the file name) registered by content-dependent module 452 associated with virtual memory subsystem 416.

In box 480a, a static name is registered. In this case, the static name /sys/loadavg represents the name (including the directory path name and the file name) registered by content-dependent module 442 associated with scheduler subsystem 412. Since this name is known at the time it is registered with the directory structure table 430, it is registered as a static name therein.

As one example, suppose the application wants to read the file with the name /proc/3/fd/2. This name contains four indivisible components (proc, 3, fd, and 2). The virtual file system and virtual ProcFS layer perform lookups using these components. Look up of the first component ("proc") by the virtual file system 404 will indicate that further lookup operations should be performed by the virtual ProcFS layer 406, which will eventually forward lookups to the content-dependent modules. Within the virtual ProcFS layer, the name "3/fd/2" is represented three distinct entries in the directory structure table. These entries are shown in box 472a, 470a, and 469a respectively. Accordingly, the second component ("3") will be handled by module 444. The third component ("fd") will be handled by module 440, and the fourth component ("2") will be handled by module 441.

Figure 5A:
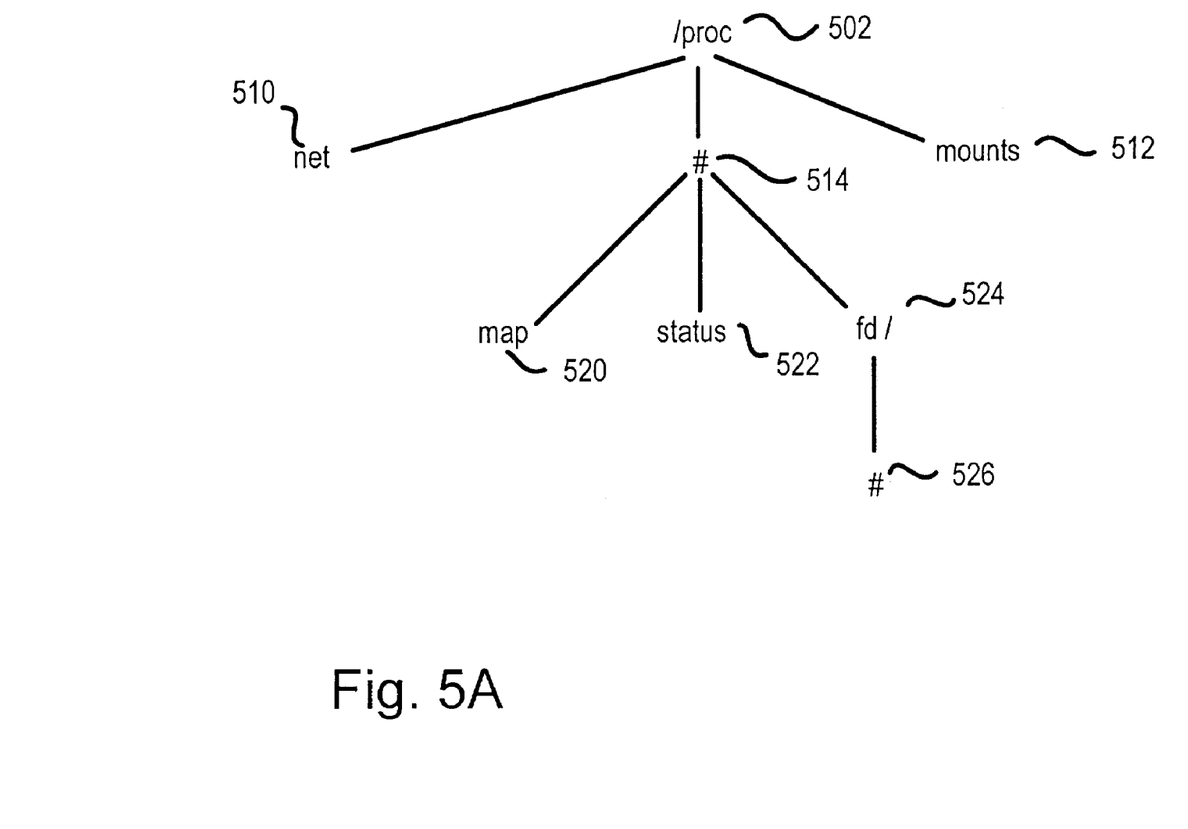
FIG. 5a shows, in accordance with one embodiment of the present invention, a virtual ProcFS layer view of an exemplary directory structure as registered by the content-dependent modules.
Figure 5B:
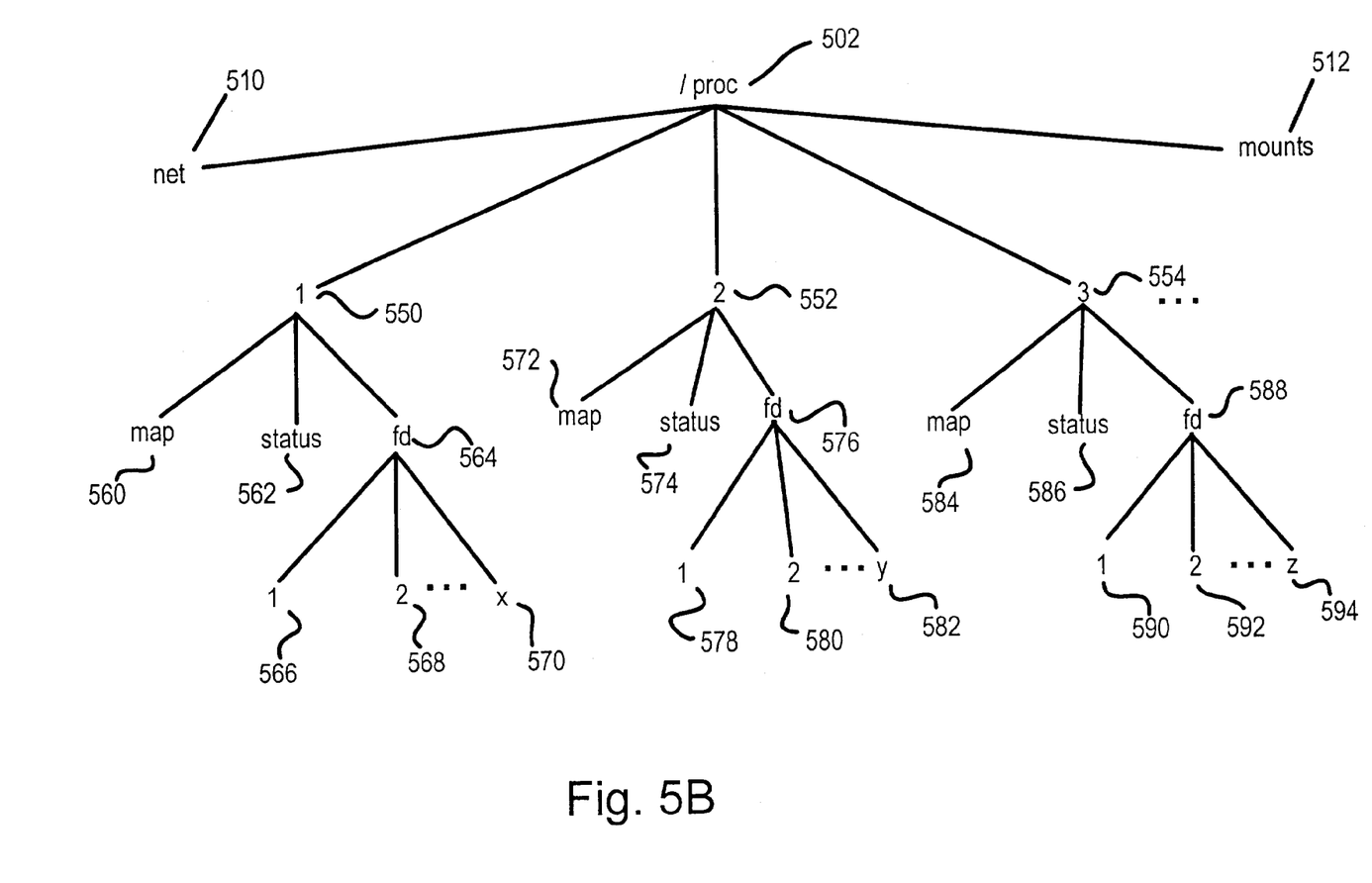
FIG. 5b shows, in accordance with one embodiment of the present invention, the application view of the exemplary directory structure of FIG. 5A.

FIG. 5a shows a virtual ProcFS layer view of an exemplary directory structure as registered by the content-dependent modules. FIG. 5b shows the application view of the same exemplary directory structure. In FIG. 5a, the name space is established at the time of registration, but many of the actual names (including exact paths and exact module names) are not known at registration time. For example, in the exemplary directory structure of FIG. 5a, the module name "net" 510 represents a static entry into the directory structure table since the name is known at the time of registration with the directory structure table. Likewise, the module name "mounts" (512) represents another static entry into the directory structure table.

However, the entry 514 is a dynamic entry, and more specifically a dynamic name for a directory. For every instance of subdirectory 514 (represented by the #/), there is a file called "map" (520), a file name "status" (522) and a subdirectory "fd/" (524). Map 520 provides information pertaining to the memory map of the task/process. Status 522 furnishes information pertaining to the status of a process. Status can relate to, for example, how much time the task has been running, what is the status of the task, and the like.

In the example of FIG. 5a, subdirectory "fd/" relates to file descriptors and gives information pertaining to how many files have been opened. Since the number of files opened during execution is not known at registration time, the exact names of the open files are represented by a dynamic entry, which is shown by reference number 526.

FIG. 5b shows the same view of FIG. 5a except that the view in FIG. 5b represents what the application sees at an arbitrary point in time during execution after the virtual ProcFS layer consults the directory structure table. Note that FIG. 5b shows a snapshot of all the instances of dynamic entries, which is often not the case as the virtual ProcFS layer may consult and instantiate the names for only a subset of the entries in the directory structure table at any given point in time during execution.

In FIG. 5b, the static entries 510 and 512 are as discussed in connection with FIG. 5a. There are three instances of dynamic subdirectory 514, which are shown by reference numbers 550, 552 and 554 of FIG. 5b. Each instance of dynamic subdirectory 514 includes all the files/subdirectories under that subdirectory instance, which are shown in FIG. 5a by reference numbers 520, 522, 524 and 526. Thus, the dynamic directory instance 550 includes a map file 560, a status file 562, and a file descriptor subdirectory 564 containing file descriptor files of which there are X number of instances (shown by reference numbers 566, 568 and 570). The dynamic directory instance 55w includes a map file 572, a status file 574, and a file descriptor subdirectory 576 containing file descriptor files of which there are Y number of instances (shown by reference numbers 578, 580 and 582). The dynamic directory instance 554 includes a map file 584, a status file 586, and a file descriptor subdirectory 588 containing file descriptor files of which there are Z number of instances (shown by reference numbers 590, 592 and 594). In this example, X, Y, and Z can be any arbitrary number of integers and although only three instances of the dynamic subdirectory 514 is shown in FIG. 5b, there may be any number of dynamic directory instances. Also, the enumerations derived from the dynamic names do not need to be sequential at all points in time as instances are created and removed from time to time.

Note that in FIG. 5b, although there are three instances of the map files (shown by reference numbers 560, 572 and 584) for the three instances of the dynamic subdirectory 514, the contents of each of these map files may be different because they are associated with different processes altogether.

In accordance with one aspect of the present invention, support module 462 also keeps track of the parent and grandparent of a particular content-dependent module so that the context can be known when the exact module name instances are dynamically generated. The tracking by support module 462 starts when the application opens a specific instance of the file. For example, the module supporting map when acting on instance 572 must be provided the information that it is within the context of process 2 (reference number 552). The context information is created at the time the specific instance is opened, and employed for subsequent operations on that file until closed.

It is believed that the Linux process file system support the concept of a pseudo-virtual ProcFS layer, which supports static entries (i.e., the addition, deletion and/or modification thereof) whose names are known at the time of registration. It also supports limited operation in the interface between the pseudo-virtual ProcFS layer and the content-dependent modules. However, the Linux process file system does not support dynamic entries and dynamic hierarchies. This information must be built into the pseudo-virtual ProcFS layer of the Linux process file system. Also the operations handled through the interface between the pseudo-virtual ProcFS layer and the content-dependent modules of the Linux process file system do not include name lookups and other control operations. These limitations mean that the Linux process file system cannot support a fully decoupled ProcFS system, as disclosed herein, in which the virtual ProcFS layer can access the modules in an entirely content-independent manner and the content-specific information is encapsulated within the content-dependent modules.

Figure 6:
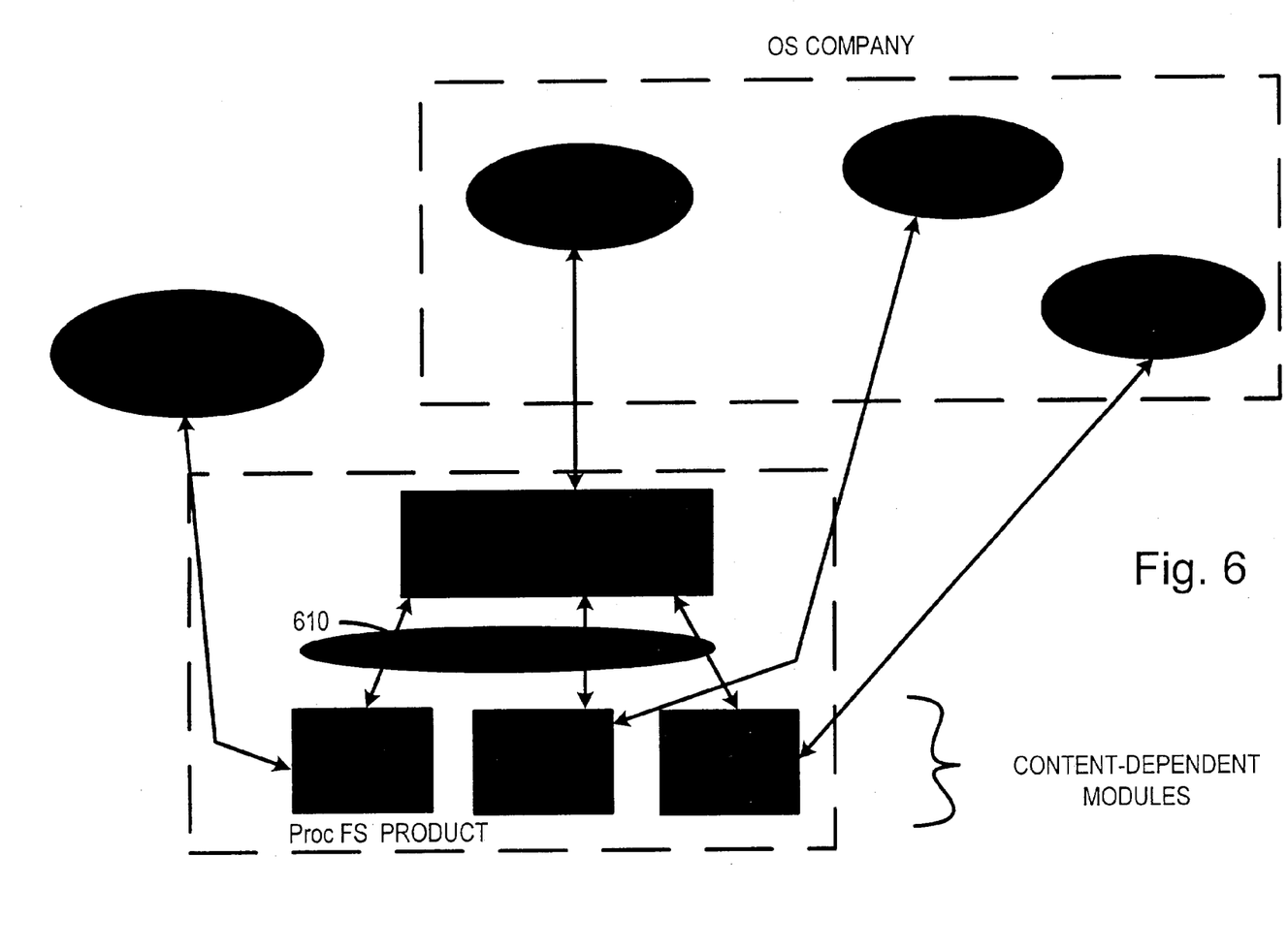
FIG. 6 conceptually illustrates, in accordance with one embodiment of the present invention, the ability of the inventive procFS to allow individual content-dependent modules to be dynamically loaded during an update cycle.

FIG. 6 is a symbolic diagram showing that due to the partitioning of the ProcFS into the virtual ProcFS layer and the content-dependent layer, the use of the common interface, and the ability to allow content-dependent modules whose names may not be known at the time of registration to register and used by the ProcFS layer, it is possible for the ISV supplied module 602 to be dynamically loaded into ProcFS 604 independently, the ProcFS management module 606 to be dynamically loaded into ProcFS 604 independently, and the virtual memory content-dependent module 608 to be dynamically loaded into ProcFS 604 independently.

These dynamically loaded modules 602, 606 and 608, when written to conform with the requirement of the common interface 610, can communicate with the virtual ProcFS layer 612 in a substantially data decoupled manner. A change in one of the kernel subsystems would require a corresponding change only in its associated content-dependent module without impacting either a virtual ProcFS layer 612, other content-dependent modules, the remainder of the directory structure table, or the support module.

It is not necessary for any single team to know the details regarding the content, format, and directory hierarchy associated with any other module other than the one which that team is responsible for. Also, it is not required for any single team to coordinate the effort with other teams in order to come up with an updated ProcFS system. Accordingly, any change to the ProcFS can be accomplished with minimal transaction cost and delay, enhancing customer satisfaction.

The data coupling issue of the prior art is substantially eliminated by the use of the common interface and the virtual ProcFS layer, which does not require any knowledge of the details of the content and format of the various internal kernel data structures. Thus, individual content-dependent modules associated with individual kernel subsystem can be updated and/or dynamically loaded into the ProcFS at any time and the dynamic scheme of name registration allows the modules to register without requiring any advance knowledge of the execution-time name.

While this invention has been described in terms of several preferred embodiments, there are alterations, permutations, and equivalents which fall within the scope of this invention. For example, although the invention has been described in the context of a UNIX example, the inventive methods and apparatus also apply to other operating system environments, such as Linux, Windows, and the like. As another example, although the specific exemplary implementation discussed herein positions the virtual ProcFS layer and/or the content-dependent modules in the OS kernel space, the invention also applies to situations where the virtual ProcFS layer and/or the content-dependent modules are implemented in the user/application space or in a combination thereof. As another example, although the specific embodiments discussed herein show a virtual file system layer, the use of such a virtual file system layer, such as virtual file system 404 of FIG. 4 is not absolutely necessary to practice the invention herein. As a further example, although the use of a special symbol is employed to denote that an entry is a dynamic name, other techniques (such as using a flag) can also be used to signify that a particular entry is dynamic. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In an operating system of a computer, a process file system for allowing an application program to monitor information pertaining to a plurality of subsystems using a file system paradigm, comprising:
    a virtual process file system layer that accesses contents of said plurality of subsystems in a content-independent manner;
    a plurality of content-dependent modules, each of said plurality of subsystems being associated with at least one of said plurality of content-dependent modules, a first content-dependent module of said plurality of content-dependent modules being configured to access a first data structure of a first subsystem of said plurality of subsystems, said content-independent manner being independent of at least one of a content, format, or directory hierarchy of said first data structure;
    an interface facilitating data exchange between said plurality of content-dependent modules and said virtual process file system layer; and
    a directory structure table, said directory structure table containing names of said plurality of content-dependent modules, a name of said plurality of content-dependent modules being registered with said directory structure table by respective one of said plurality of content-dependent modules upon initialization of said respective one of said plurality of content-dependent modules, wherein at least one name associated one content-dependent module of said plurality of dependent modules is unknown at registration time and thus registered in said directory structure table as a dynamic name, wherein said plurality of content dependent modules, said interface, and said directory structure table enable said virtual process file system layer of said process file system to access said contents of said plurality of subsystems in said content-independent manner.

2. The process file system of claim 1 wherein said first content-dependent module encapsulates content information pertaining to said first data structure.

3. The process file system of claim 1 wherein said first content-dependent module encapsulates format information pertaining to said first data structure.

4. The process file system of claim 1 wherein said names include pathnames.

5. The process file system of claim 1 further comprising a support module, said names of said plurality of content-dependent modules being registered with said directory structure table using said support module.

6. The process file system of claim 5 wherein said first content-dependent module is registered with a first dynamic name at registration time, said first dynamic name being instantiated into at least one name instance when said application program queries data in said first data structure.

7. The process file system of claim 6 wherein said support module tracks context information pertaining to said at least one name instance.

8. The process file system of claim 1 wherein said dynamic name is indicated in said directory structure table in accordance with a predefined convention.

9. The process file system of claim 1 wherein said dynamic name includes one of a predefined symbol and a predefined combination of symbols, said one of said predefined symbol and predefined combination of symbols indicating a dynamic characteristic of said dynamic name, said dynamic characteristic including having an execution-time name that is unknown at registration time.

10. The process file system of claim 1 wherein said first subsystem is one of a file descriptor subsystem, a scheduler subsystem, a task/process subsystem, and a virtual memory subsystem.

11. The process file system of claim 1 wherein said plurality of content-dependent modules are implemented as dynamic linkable modules.

12. The process file system of claim 11 wherein said virtual process file system layer is implemented in a kernel space of a computer system.

13. The process file system of claim 1 wherein said dynamic name pertains to a transient process.

14. The process file system of claim 1 wherein said dynamic name includes a dynamic subdirectory.

15. A method for facilitating interaction between an application program and a plurality of subsystems using a file system paradigm using a process file system, comprising:
    providing a virtual process file system layer, said virtual process file system layer being configured to access contents of said plurality of subsystems in a content-independent manner;
    providing a plurality of content-dependent modules, each of said plurality of subsystems being configured to be associated with at least one of said plurality of content-dependent modules, a first content-dependent module of said plurality of content-dependent modules being configured to access a first data structure of a first subsystem of said plurality of subsystems, said content-independent manner being independent of at least one of a content, format, or directory hierarchy of said first data structure;
    providing an interface for facilitating data exchange between said plurality of content-dependent modules and said virtual process file system layer; and
    providing a directory structure table, said directory structure table being configured to track names of said plurality of content-dependent modules, a name of said plurality of content-dependent modules being configured to be registered with said directory structure table by respective one of said plurality of content-dependent modules upon initialization of said respective one of said plurality of content-dependent modules, wherein at least one name associated with one content-dependent module of said plurality of dependent modules is unknown at registration time and thus configured to be registered in said directory structure table as a dynamic name, wherein said plurality of content dependent modules, said interface, and said directory structure table enable said virtual process file system layer of said process file system to access said contents of said plurality of subsystems in said content-independent manner.

16. The method of claim 15 wherein said first content-dependent module encapsulates content information pertaining to said first data structure.

17. The method of claim 15 wherein said first content-dependent module encapsulates format information pertaining to said first data structure.

18. The method of claim 15 wherein said names include pathnames.

19. The method of claim 15 further comprising providing a support module, said names of said plurality of content-dependent modules being registered with said directory structure table using said support module.

20. The method of claim 19 wherein said first content-dependent module is registered with a first dynamic name at registration time, said first dynamic name being instantiated into at least one name instance when said application program queries data in said first data structure.

21. The method of claim 20 wherein said support module tracks context information pertaining to said at least one name instance.

22. The method of claim 15 wherein said dynamic name is indicated in said directory structure table in accordance with a predefined convention.

23. The method of claim 15 wherein said dynamic name includes one of a predefined symbol and a predefined combination of symbols, said one of said predefined symbol and predefined combination of symbols indicating a dynamic characteristic of said dynamic name, said dynamic characteristic including having an execution-time name that is unknown at registration time.

24. The method of claim 15 wherein said dynamic name includes a dynamic subdirectory.

25. In a computer, a method for facilitating interaction between an application program and a subsystem using a file system paradigm, comprising:
  providing a virtual process file system layer, said virtual process file system layer being configured to access contents of said subsystem in a content-independent manner using file system-like operations;
  providing a content dependent module, said content dependent module being associated with said subsystem and is configured interact with said subsystem in a content-dependent manner, said content-independent manner being independent of at least one of a content, format, or directory hierarchy of files that model said subsystem; and
  providing a directory structure table, said directory structure table being configured to track a name of said content dependent module, wherein said content-dependent module is configured to be registered with said directory structure table using a dynamic name to represent a name that is unknown at when said content-dependent module is registered with said directory structure table, wherein said content dependent module and said directory structure table enable said virtual process file system layer of said process file system to access said contents of said subsystem in said content-independent manner.

26. The method of claim 25 wherein said content-dependent module encapsulates content information pertaining to said data structure.

27. The method of claim 25 wherein said dynamic name include a dynamic pathname.

28. The method of claim 25 further comprising providing a support module, said support module tracking context information pertaining to said dynamic name.

* * * * *

UNITED STATES PATENT AND TRADEMARK OFFICE
CERTIFICATE OF CORRECTION

PATENT NO. : 7,194,478 B2  
APPLICATION NO. : 10/293073  
DATED : March 20, 2007  
INVENTOR(S) : Edward J Sharpe et al.

It is certified that error appears in the above-identified patent and that said Letters Patent is hereby corrected as shown below:

In column 8, line 21, delete "(L#/lwp/#)" and insert -- (/#/lwp/#) --, therefor.

Signed and Sealed this

Eleventh Day of November, 2008

JON W. DUDAS  
*Director of the United States Patent and Trademark Office*